US008417913B2

(12) United States Patent
Elnozahy et al.

(10) Patent No.: US 8,417,913 B2
(45) Date of Patent: *Apr. 9, 2013

(54) SUPERPAGE COALESCING WHICH SUPPORTS READ/WRITE ACCESS TO A NEW VIRTUAL SUPERPAGE MAPPING DURING COPYING OF PHYSICAL PAGES

(75) Inventors: Elmootazbellah Nabil Elnozahy, Austin, TX (US); James Lyle Peterson, Austin, TX (US); Ramakrishnan Rajamony, Austin, TX (US); Hazim Shafi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2560 days.

This patent is subject to a terminal disclaimer.

(21) Appl. No.: 10/713,733

(22) Filed: Nov. 13, 2003

(65) Prior Publication Data
US 2005/0108496 A1    May 19, 2005

(51) Int. Cl.
*G06F 12/00*    (2006.01)
(52) U.S. Cl. ........ 711/202; 711/154; 711/162; 711/170; 711/203; 711/206; 711/207
(58) Field of Classification Search ............ 711/154, 711/162, 170, 202, 203, 206, 207
See application file for complete search history.

(56) References Cited

U.S. PATENT DOCUMENTS

| | | | | |
|---|---|---|---|---|
| 5,206,939 A * | 4/1993 | Yanai et al. | .................. | 711/4 |
| 5,386,526 A | 1/1995 | Mitra et al. | | |
| 5,784,707 A * | 7/1998 | Khalidi et al. | ............... | 711/206 |
| 5,835,964 A * | 11/1998 | Draves et al. | ............... | 711/207 |
| 5,974,507 A | 10/1999 | Arimilli et al. | | |
| 6,073,226 A * | 6/2000 | Cutshall et al. | ............... | 711/203 |
| 6,085,296 A * | 7/2000 | Karkhanis et al. | ........... | 711/147 |
| 6,175,906 B1 * | 1/2001 | Christie | ..................... | 711/207 |

(Continued)

OTHER PUBLICATIONS

Romer et al. "Reducing TLB and Memory Overhead Using Online Superpage Promotion", Jun. 22-24, 1995, 22nd Annual International Symposium on Computer Architecture, pp. 176-187.*

(Continued)

*Primary Examiner* — Arpan P. Savla
(74) *Attorney, Agent, or Firm* — Dwayne Nelson; Jack V. Musgrove (57) ABSTRACT

A method of assigning virtual memory to physical memory in a data processing system allocates a set of contiguous physical memory pages for a new page mapping, instructs the memory controller to move the virtual memory pages according to the new page mapping, and then allows access to the virtual memory pages using the new page mapping while the memory controller is still copying the virtual memory pages to the set of physical memory pages. The memory controller can use a mapping table which temporarily stores entries of the old and new page addresses, and releases the entries as copying for each entry is completed. The translation lookaside buffer (TLB) entries in the processor cores are updated for the new page addresses prior to completion of copying of the memory pages by the memory controller. The invention can be extended to non-uniform memory array (NUMA) systems. For systems with cache memory, any cache entry which is affected by the page move can be updated by modifying its address tag according to the new page mapping. This tag modification may be limited to cache entries in a dirty coherency state. The cache can further relocate a cache entry based on a changed congruence class for any modified address tag.

20 Claims, 5 Drawing Sheets

U.S. PATENT DOCUMENTS

| | | | |
|---|---|---|---|
| 6,182,198 B1* | 1/2001 | Hubis et al. | 711/162 |
| 6,212,613 B1* | 4/2001 | Belair | 711/207 |
| 6,275,897 B1 | 8/2001 | Bachmat | |
| 6,341,341 B1* | 1/2002 | Grummon et al. | 711/162 |
| 6,434,670 B1 | 8/2002 | Arimilli et al. | |
| 6,434,681 B1* | 8/2002 | Armangau | 711/162 |
| 6,477,612 B1* | 11/2002 | Wang | 711/2 |
| 6,725,289 B1* | 4/2004 | Waldspurger et al. | 710/9 |
| 6,732,238 B1* | 5/2004 | Evans et al. | 711/128 |
| 6,904,490 B2* | 6/2005 | Arimilli et al. | 711/5 |
| 6,907,494 B2* | 6/2005 | Arimilli et al. | 711/5 |
| 7,117,312 B1 | 10/2006 | Cypher | |

OTHER PUBLICATIONS

Tanenbaum, Andrew S., "Structured Computer Organization", 1984, Prentice-Hall, Inc., 2nd Edition, pp. 10-12.*

Talluri et al. "Surpassing the TLB performance of superpages with less operating system support", 1994, ACM SIGOPS Operating Systems Review, vol. 28, Issue 5.*

Hennessy, John L., Patterson, David A., "Computer Organization and Design, The Hardware/Software Interface", 1998, Morgan Kaufmann Publishers, Inc., Second Edition, pp. 657, 658, 668.*

Romer et al., "Reducing TLB and Memory Overhead Using Online Superpage Promotion," 1995.

Fang et al., "Reevaluating Online Superpage Promotion with Hardware Support".

Handy, Jim, "The Cache Memory Book," 1998, Academic Press, in.c, Second Edition, pp. 12-14, 19, 20, 22, 44-47, 66, 76, 98, 138, 148.

Swanson, Mark, et al., "Increasing TLB Read Using Superpages Backed by Shadow Memory," 1998, The 25th Annual International Symposium on Computer Architecture, pp. 204-213.

* cited by examiner

SUPERPAGE COALESCING WHICH SUPPORTS READ/WRITE ACCESS TO A NEW VIRTUAL SUPERPAGE MAPPING DURING COPYING OF PHYSICAL PAGES

BACKGROUND OF THE INVENTION

1. Field of the Invention

The present invention generally relates to computer systems, specifically to memory subsystems for computers, and more particularly to a method of providing efficient mappings between virtual memory and physical memory.

2. Description of the Related Art

Figure 1:
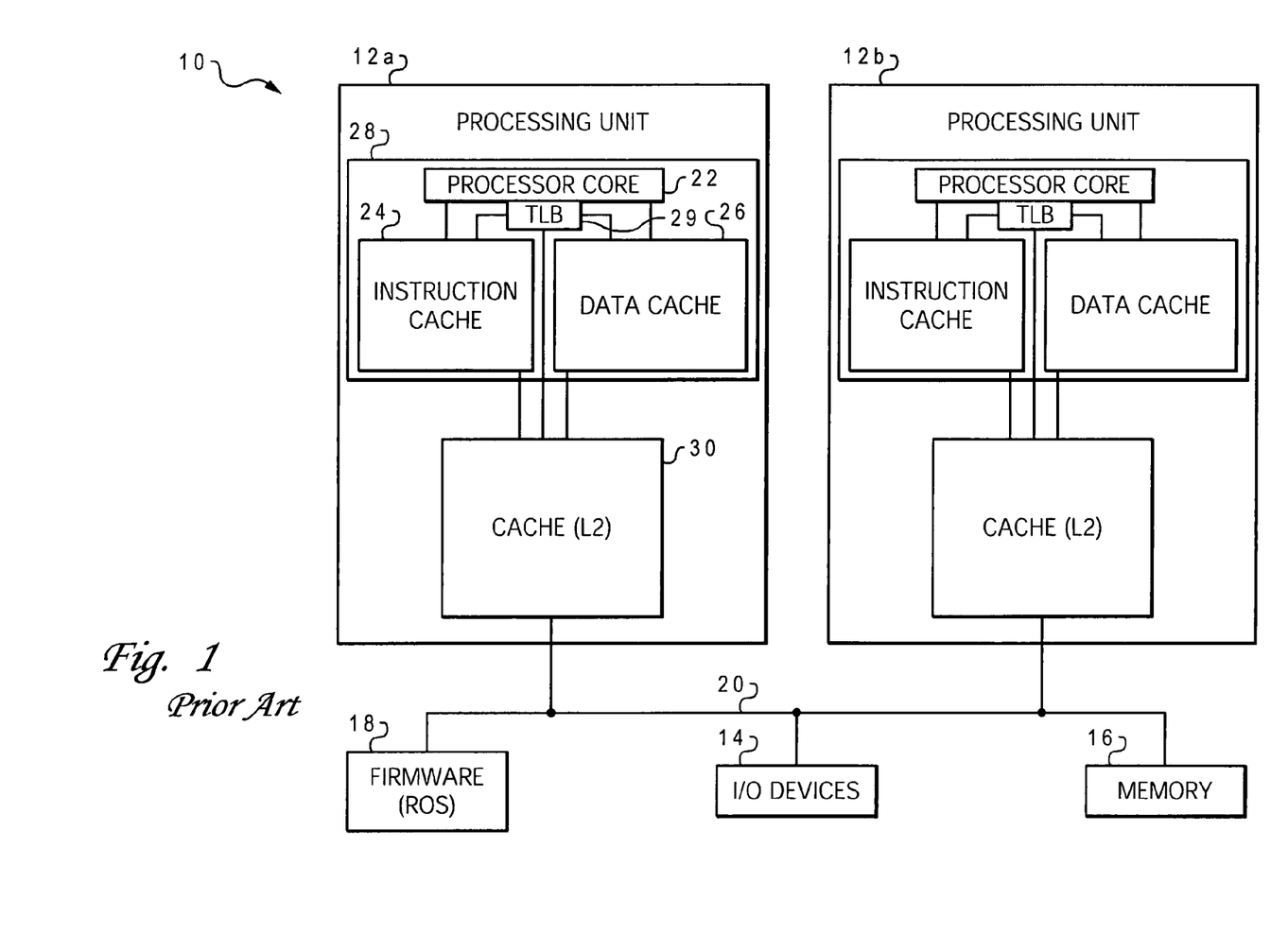
FIG. 1 is a block diagram of a conventional computer system, depicting a memory hierarchy which includes a main memory device and multiple memory caches.

The basic structure of a conventional computer system 10 is shown in FIG. 1. Computer system 10 may have one or more processing units, two of which 12a and 12b are depicted, which are connected to various peripheral devices, including input/output (I/O) devices 14 (such as a display monitor, keyboard, and permanent storage device), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial, parallel and universal bus ports for connection to, e.g., modems or printers. Those skilled in the art will further appreciate that there are other components that might be used in conjunction with those shown in the block diagram of FIG. 1; a display adapter might be used to control a video display monitor, a memory controller can be used to access memory 16, etc. Also, instead of connecting I/O devices 14 directly to bus 20, they may be connected to a secondary (I/O) bus which is further connected to an I/O bridge to bus 20. The computer can have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit 12 can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 usually comes through cache 30. Although FIG. 1 depicts only a two-level cache hierarchy, multi-level cache hierarchies can be provided where there are many levels of interconnected caches. The main memory can further be distributed among many processor clusters in a non-uniform memory array (NUMA).

A cache has many blocks which individually store the various program instruction and operand data values. The blocks in any cache are divided into groups of blocks called sets or congruence classes. A set is the collection of cache blocks that a given memory block can reside in. For any given memory block, there is a unique set in the cache that the block can be mapped into, according to preset mapping functions. The number of blocks in a set is referred to as the associativity of the cache, e.g. 2-way set associative means that for any given memory block there are two blocks in the cache that the memory block can be mapped into; however, several different blocks in main memory can be mapped to any given set. A 1-way set associate cache is direct mapped, that is, there is only one cache block that can contain a particular memory block. A cache is said to be fully associative if a memory block can occupy any cache block, i.e., there is one congruence class, and the address tag is the full address of the memory block.

An exemplary cache line (block) includes an address tag field, a state bit field, an inclusivity bit field, and a value field for storing the program instruction or operand data. The state bit field and inclusivity bit fields are used to maintain cache coherency in a multiprocessor computer system (to indicate the validity of the value stored in the cache). For example, a coherency state can be used to indicate that a cache line is valid but not necessarily consistent with main memory, i.e., when a process has written a value to that cache line but the value has not yet migrated down the memory hierarchy to "system" memory (such a cache line is referred to as "dirty"). The address tag is a subset of the full address of the corresponding memory block. A compare match of an incoming address with one of the tags within the address tag field indicates a cache "hit." The collection of all of the address tags in a cache (and sometimes the state bit and inclusivity bit fields) is referred to as a directory, and the collection of all of the value fields is the cache entry array.

When all of the blocks in a congruence class for a given cache are full and that cache receives a request, whether a read or write, to a memory location that maps into the full congruence class, the cache must evict one of the blocks currently in the class. The cache chooses a block by one of a number of means known to those skilled in the art (least recently used (LRU), random, pseudo-LRU, etc.) to be evicted. If the data in the chosen block is modified, that data is written to the next lowest level in the memory hierarchy which may be another cache (in the case of the L1 or on-board cache) or main memory (in the case of an L2 cache, as depicted in the two-level architecture of FIG. 1). By the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an eviction. At the end of this process, the cache no longer holds a copy of the evicted block.

Figure 2:
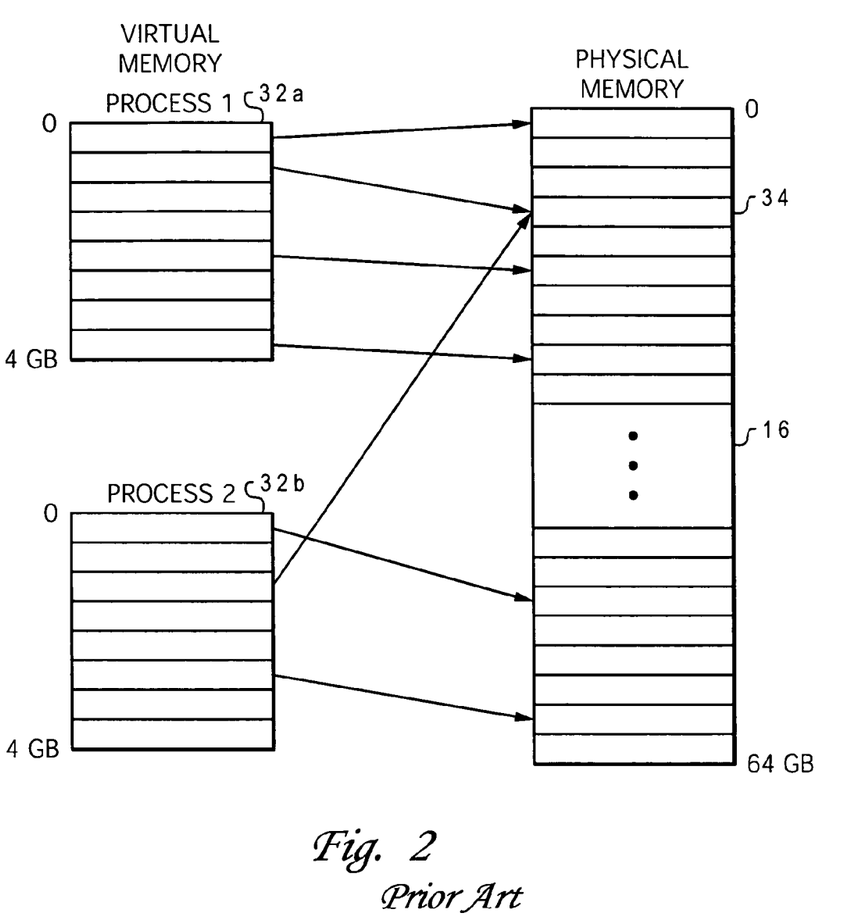
FIG. 2 is a pictorial representation of a conventional technique for virtual-to-physical memory mapping in a computer system such as that shown in FIG. 1.

Memory is utilized by program applications as illustrated in FIG. 2. A program application is compiled using relative memory addresses, referred to as virtual memory, that correspond to locations in physical memory. For example, two processes 32a, 32b might each utilize virtual memory addresses from zero to four gigabytes (GB), but these virtual addresses map to different physical addresses in memory 16, which may provide a total physical memory of 64 GB. The memory for a process is divided into multiple "pages" to make more efficient use of physical memory, since a process usually does not need access to all virtual memory space at any given time. Virtual memory mapping allows multiple processes to share a given physical page of memory, as indicated at physical page 34. The virtual-to-physical memory mapping is handled in processor core 22 by providing a translation lookaside buffer (TLB) 29 whose entries keep track of current virtual-to-physical address assignments.

Many computer architectures support multiple virtual page sizes. Large pages (larger than the smallest virtual page size) are sometimes referred to as "superpages," and these virtual superpages map to similarly sized "super" physical pages. Thus, in a system where the page size is 4 kilobytes (KB), a virtual superpage of 64 KB maps to 16 contiguous 4-KB physical pages making up 64 KB. Superpages typically have alignment requirements both in the virtual and physical address spaces. Thus a 64 KB virtual superpage would typically have to be aligned on a 64 KB boundary. Similarly, the 64 KB of physical page to which it maps would also have to be aligned on a 64 KB boundary. However, the use of superpages gives rise to a tradeoff. While superpages can improve the TLB hit rate by reducing the number of entries that need to be concurrently maintained in the TLB, they can also lead to underutilization of the physical memory if the application does not use the entire superpage.

This tradeoff can be resolved by providing the ability to dynamically vary the superpage size based on an application's needs. The notion of dynamically varying the superpage size based on application execution characteristics is known in the art; see, e.g., the article entitled "Reducing TLB and Memory Overhead Using Online Superpage Promotion," by Romer et al. (22nd Annual Proceedings of the International Symposium on Computer Architecture, 1995). That solution resorts to software-directed memory copying in order to make a contiguous set of physical pages hold the application data. This approach, however, still has drawbacks. When the operating system (OS) determines that two or more (super)pages have to be coalesced into a larger superpage, it first sets aside a sufficiently large contiguous set of physical pages to map the larger superpage, and flushes any dirty lines from the caches. It next uses the processor to copy data from the original set of physical pages to the physical pages forming the superpage. Only after the copying is completed can the superpage be formed by coalescing page table entries. During this time, the application continues to suffer from poor TLB behavior.

An alternative method of handling this tradeoff uses a hardware approach, as discussed in the article entitled "Reevaluating Online Superpage Promotion with Hardware Support," by Fang et al. (Proceedings of the Seventh International Symposium on High Performance Computer Architecture, pp. 63-72, January 2001). The Impulse approach does not actually copy the pages over into new physical locations, but instead provides an extra level of address remapping at the main memory controller. The remapped addresses are inserted into the TLB as mappings for the virtual addresses. The memory controller maintains its own page tables for these "shadow" memory mappings. Impulse also has its drawbacks. First of all, the physical superpage is not contiguous. Secondly, the size of the memory controller page tables limits the availability of remapped superpages, and the mapping table can quickly grow. In a typical 4 GB application with 4 KB pages, the mapping table could easily require more than one million entries. Finally, this lookup procedure is on the critical path to memory access. These limitations are exacerbated in NUMA systems having multiple memory controllers.

In light of the foregoing, it would be desirable to devise an improved method of superpage coalescing which is not limited by the size of hardware tables, but still allows the application TLB behavior to improve immediately, i.e., without waiting on software-directed copying. It would be further advantageous if the method were easily adapted for use with NUMA systems.

SUMMARY OF THE INVENTION

It is therefore one object of the present invention to provide an improved method of superpage coalescing in a data processing system.

It is another object of the present invention to provide such a method which facilitates efficient superpage coalescing while reducing latentcies associated with page copying.

It is yet another object of the present invention to provide a hardware-supported method of migrating virtual-to-physical memory mappings in a memory hierarchy which includes one or more cache levels.

The foregoing objects are achieved in a method of assigning virtual memory to physical memory in a data processing system, generally comprising the steps of allocating a set of aligned, contiguous physical memory pages for a new virtual superpage, instructing a memory controller to move a plurality of physical memory pages corresponding to the old mapping to the set of potentially different physical memory pages corresponding to the new page mapping, and then accessing the virtual memory pages making up the superpage using the new page mapping while the memory controller is still copying the old physical memory pages to the new physical memory pages. In one embodiment, the memory controller uses a mapping table which temporarily stores entries of the old and new page addresses, and releases the entries in the mapping table as copying for each entry is completed. During copying, accesses to the affected pages are handled as follows. Any read operation for an address of the new page mapping which is currently being copied is directed to the corresponding address of the old page mapping. Any write operation for an address of the new page mapping which is currently being copied is directed to both the address of the new page mapping and the corresponding address of the old page mapping. Any write operation for an address of the new page mapping which has not yet been copied is directed only to the corresponding address of the old page mapping. The translation lookaside buffer (TLB) entries in the processor cores are updated for the new page addresses prior to completion of copying of the memory pages by the memory controller. The invention can be extended to non-uniform memory array (NUMA) systems by allowing entries in one memory controller to point to physical pages in the new page mapping that are located in remote memory arrays controlled by other memory controllers.

For systems with cache memory, any cache entry which is affected by the page move is updated by modifying its address tag according to the new page mapping. This tag modification may be limited to cache entries in a dirty coherency state, that is, only for those entries containing a valid value which is not present elsewhere in the memory hierarchy. The cache can further relocate a cache entry based on a changed congruence class for the modified address tag.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED
EMBODIMENT(S)

Figure 3:
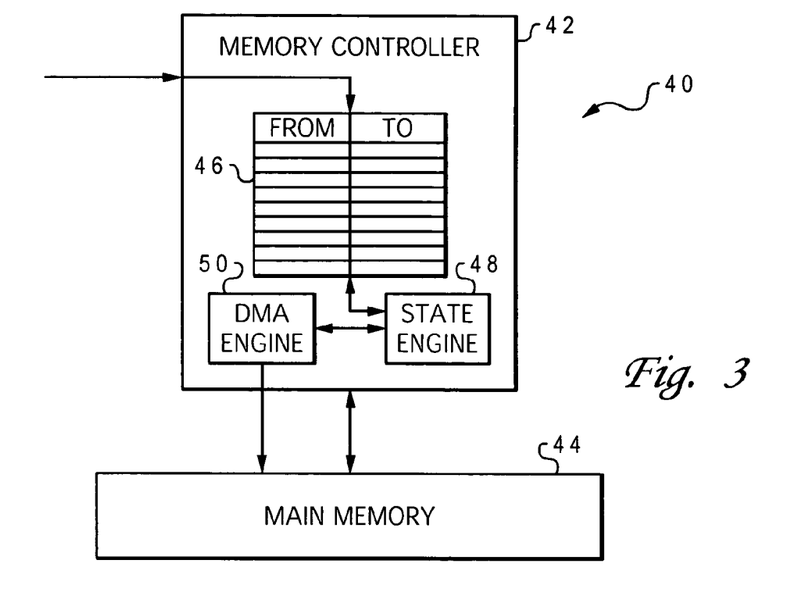
FIG. 3 is a block diagram of one embodiment of a memory subsystem constructed in accordance with the present invention having a memory controller which allows a computer system to quickly use newly mapped superpage addresses while copying of the constituent pages is still underway.

With reference now to the figures, and in particular with reference to FIG. 3, there is depicted one embodiment 40 of a memory subsystem constructed in accordance with the present invention. Memory subsystem 40 is generally comprised of a memory controller 42 and a system or main memory array 44, and is adapted to facilitate superpage coalescing for an operating system which controls virtual-to-physical page mappings in a data processing system. The operating system (OS) may have many conventional features including appropriate software which determines page mappings, and decides when it is desirable to coalesce pages into a larger (super)page; such details are beyond the scope of the present invention but will become apparent to those skilled in the art.

Memory subsystem 40 provides a hardware solution to superpage coalescing which reduces or eliminates the poor TLB behavior that occurs during the prior art software-directed copying solution. In the present invention, the OS can immediately change its mappings for the constituent pages into one mapping for the new superpage, with close to zero delay and without waiting for completion of the actual page copying. The OS can use the new mappings right away because the memory controller maintains a temporary mapping from the new physical pages back to the old physical pages until the new physical pages are brought up to date. As a result, the application TLB behavior improves immediately.

Memory controller 42 has an input which receives read and write instructions from a generalized interconnect or system bus, and processes those instructions by accessing main memory array 44 in a known manner. Memory controller 42 also receives memory management instructions, including instructions regarding superpage coalescing. In particular, memory controller 42 can receive instructions from the operating system which define a set of pages to be copied to new physical memory locations as part of the coalescing process. The old and new physical page addresses are stored temporarily in a mapping table 46. Mapping table 46 maintains the mapping information while the page-to-page copying is underway. Although the number of entries in mapping table 46 is limited, they are reusable since they are not needed once the copying is complete, so repeated superpage formation is unlimited. The number of entries in mapping table 46 may vary depending upon the particular operating system and page sizes involved, but a table having 32 slots is considered exemplary.

Memory controller 42 may utilize a state engine 48 to step through the copy process. State engine 48 sequentially reads the paired FROM (old) and TO (new) addresses in mapping table 46 and controls a direct-memory access (DMA) engine 50 that is hidden from the operating system to carry out the copying. DMA engine 50 runs in the background, that is, without interrupting program processing. As copying of a given page in mapping table 46 is lazily completed, that entry is vacated by state engine 48, i.e., it is taken out of the temporary mapping function, and no mapping remains once all copying is complete. The OS can accordingly use the new superpage mappings immediately without waiting for actual copying of the physical pages, and read/write instructions to those pages can be handled by memory controller 42 by referring back to the old physical page addresses until the new physical pages are brought up to date.

Figure 4:
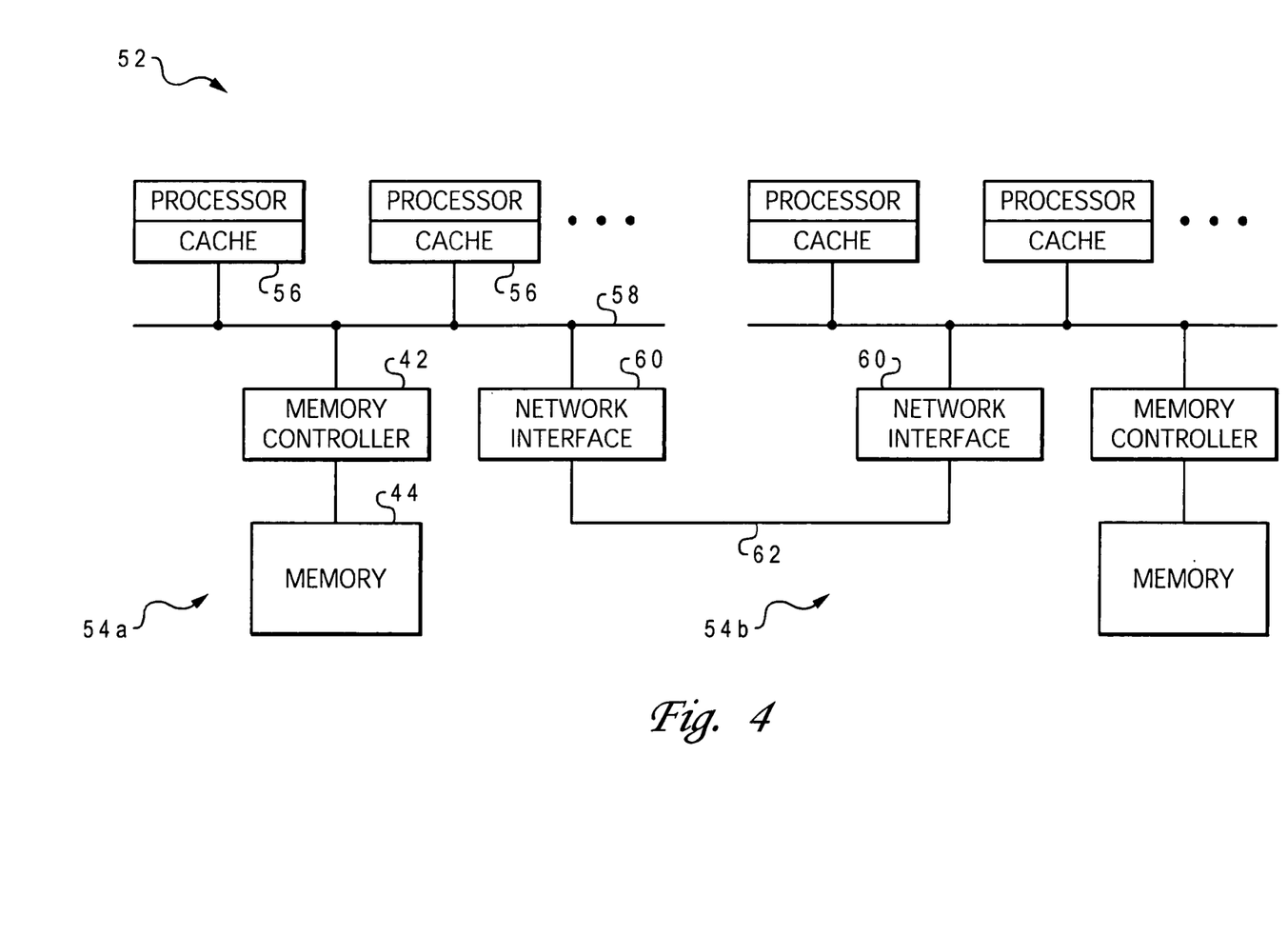
FIG. 4 is a block diagram of one embodiment of a multi-processor computer system having a non-uniform memory array which may advantageously implement the present invention using multiple memory controllers similar to the memory controller of FIG. 3.

Referring now to FIG. 4, there is depicted one embodiment of a multiprocessor computer system 52 having a non-uniform memory array (NUMA), which may advantageously utilize the present invention for page migration. Computer system 52 has a plurality of processing clusters 54a, 54b. While only two processing clusters are depicted, the system could have more. A given processing cluster includes two or more processing units 56 each comprised of a processor core and one or more cache levels which are interconnected by a system bus 58 to memory controller 42, local memory array 44, and a network interface 60. The processing clusters can interact by means of an inter-processor communications bus 62 which interconnects two of the network interfaces 60.

Computer system 52 does not have a centralized main memory, but rather distributes main memory across the many local memory arrays 44 found in the different processing clusters, and uses multiple memory controllers which have the same ability to maintain temporary mappings for a superpage coalescing procedure. Pointers in the mapping tables of the memory controllers can straddle memory controller boundaries, that is, they can map to physical locations anywhere in the total amount of available memory, not just to those physical locations controlled by that controller in its corresponding local memory array. In this manner, a virtual page can easily migrate from an old physical location in one processing cluster to a new physical location in a second processing cluster, for example, to bring a data set closer to a processing cluster that is using the data.

Figure 5:
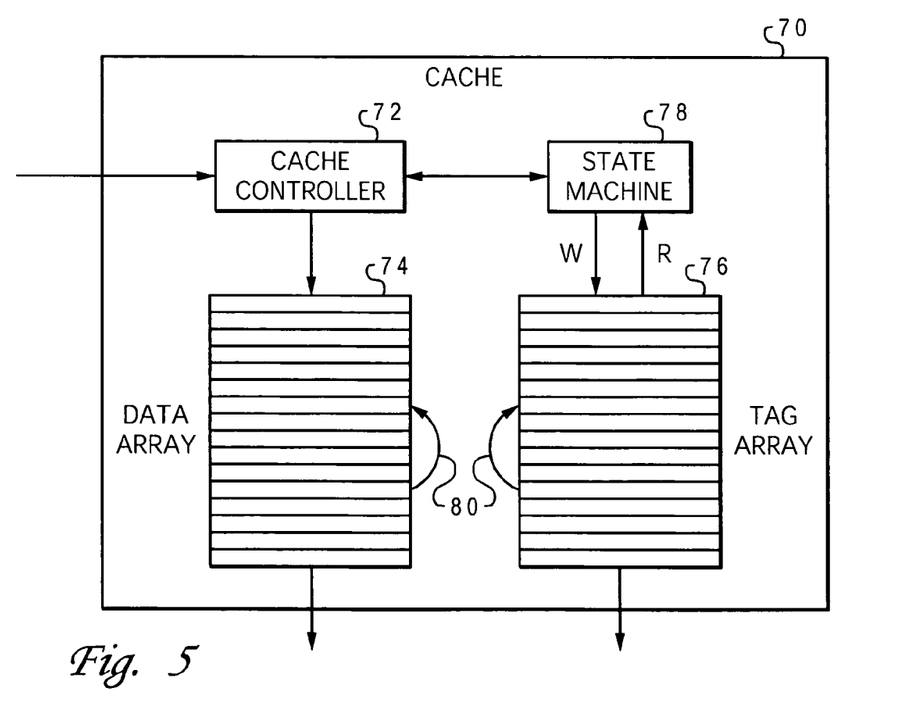
FIG. 5 is a block diagram of one embodiment of a cache memory constructed in accordance with the present invention which updates address tag information based on newly mapped virtual-to-physical memory locations and relocates a cache line with a changed associativity.

For data processing systems such as computer system 52 that utilize caches, page migration/coalescing must take into consideration any current (valid) cache entries whose page mappings change. One way to address this concern is by simply flushing all cache blocks in the old page mappings (i.e., writing the cached values back to system memory and invalidating the cache lines). Flushing of any affected cache lines can be performed by the operating system using standard cache instructions, but this approach introduces additional delays. An alternative approach is to provide a cache in which the address tag for an affected data line can be modified without having to move the data to or from main memory. FIG. 5 illustrates one embodiment of such a cache memory 70 constructed in accordance with the present invention which updates address tag information based on newly mapped virtual-to-physical memory locations.

Cache 70 includes a cache controller 72, a data array 74 and a tag array 76 whose entries correspond respectively with the values in data array 74. Cache controller 72 receives cache instructions and accesses data array 74 and tag array 76 in a known manner to carry out read and write operations. Cache controller 72 also receives page coalescing/migration instructions from the OS, which can be broadcast to all caches in the computer system. Cache controller 72 passes on the page mapping information to a state machine 78. State machine 78 examines each of the entries in tag array 76 to determine if any current cache lines are affected by the remapping. If any valid tag is within a remapped address range, its coherency state is additionally examined to determine the appropriate action. For a "clean" coherency state (meaning that the corresponding cached value is valid and is stored elsewhere in the memory hierarchy), the cache tag can be rewritten based on the new mapping in order to incur no further latency when accessed through the new mapping. For a "dirty" coherency state (meaning that the corresponding cached value is valid but is not stored elsewhere in the memory hierarchy), the tag can be rewritten based on the new mapping. The dirty coherency state is maintained for that line, so this tag switch advantageously permits the dirty data to stay in the cache. In either case (clean or dirty) there is no need to write any data to or read any data from system memory, and all remaining valid tags are guaranteed to be consistent with the new mapping.

For set associative caches, consideration must also be given to the appropriate congruence class for any dirty cache line whose tag is modified. State machine 78 determines the congruence class of the modified tag and, if different from the congruence class of the old tag, instructs cache controller 72 to re-locate the affected cache line. Cache controller 72 handles this instruction similar to a standard write instruction, searching for an available cache line (clean or invalid) in the appropriate set and rewriting the data, as indicated at 80. The old cache line is then invalidated. If no cache line in the new set is available, the default eviction process (e.g., least recently used) is preferably employed to make a line available and the data is rewritten to that line. Alternatively, if no clean or invalid entry is found for the new set, cache controller 72 could be programmed to flush the affected cache line to a lower level of the memory hierarchy.

The depicted embodiment of cache 70 locally controls the tag remapping using state machine 78, but the procedure could instead be remotely controlled by its associated processor core.

Figure 6:
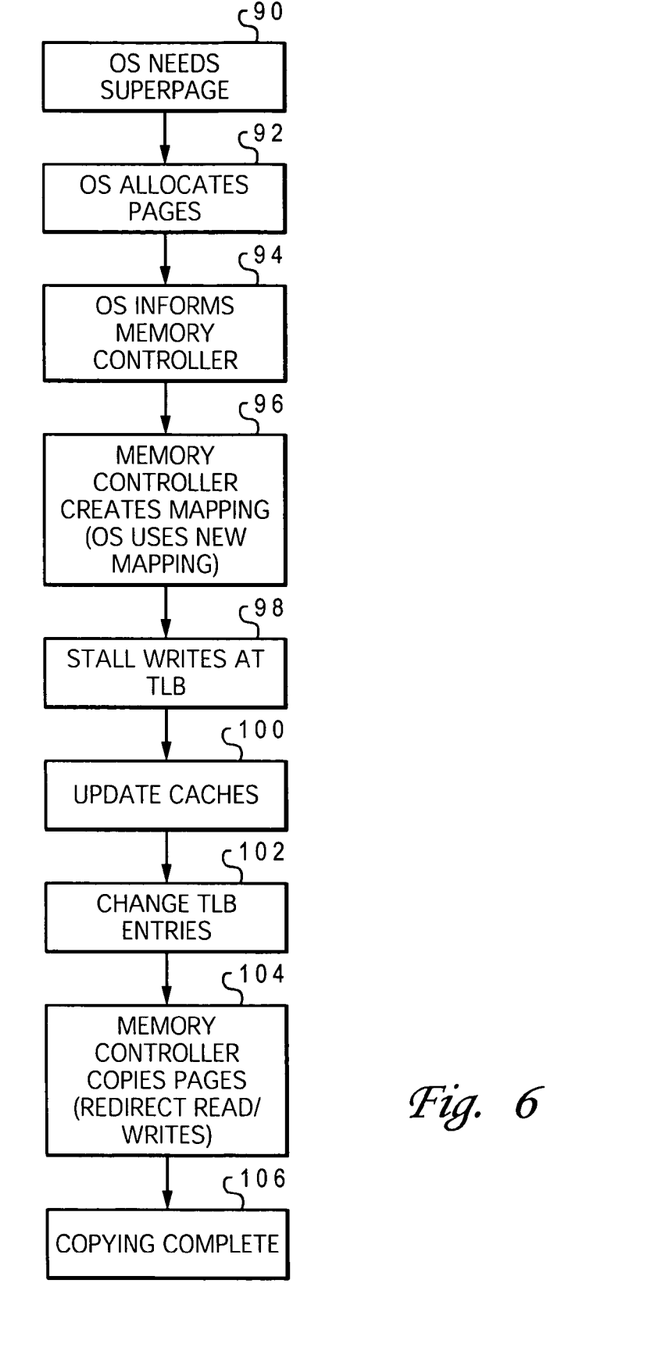
FIG. 6 is a chart illustrating the logical flow according to one implementation of the present invention.

The present invention may be further understood with reference to the flow chart of FIG. 6. The process begins when the OS decides that is it desirable to coalesce a set of pages into a larger superpage (90). In this regard, those skilled in the art will appreciate that the term "superpage" is not to be construed in a limiting sense, i.e., with regard either to the actual size of the page or to the number of smaller pages that are coalesced. The OS allocates the pages (92) by setting aside a contiguous set of physical pages to map the new superpage, and informs the memory controller of the new mapping (94). The memory controller creates the temporary mapping table and the OS immediately begins using the new mapping (96). No entry is needed for any identical mappings, i.e., when the superpage coalescing results in a page copy instruction whose new physical address is the same as the old address. For coherency, the OS stalls write operations at the processor TLBs using protection bits (98) while the caches are updated (100). The TLB entries are thereafter changed to reflect the larger superpage (102). The memory controller copies the pages while the new mappings are being used (104). While the copying proceeds, read operations to the new superpage can be handled by presenting the operations to the memory controller using the new page mapping, and the memory controller will divert the read to the old page. A write operation directed to a memory location that is currently being copied is written to both the old and new pages. A write operation directed to a memory location that is in the memory controller mapping but is not yet being copied is written only to the old page. As pages are copied, the memory controller gradually removes the temporary mappings, until all of the page copying is complete (106). The invention permits the creation of superpages made up from more (super)pages than there are slots in table 46 of memory controller 42 in FIG. 3. This is achieved by using an iterative process to create the superpages.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of assigning virtual memory to physical memory in a data processing system, comprising the steps of:
    allocating a set of physical memory pages of the data processing system for a new virtual superpage mapping;
    instructing a memory controller of the data processing system to move a plurality of virtual memory pages corresponding to an old page mapping to the set of physical memory pages corresponding to the new virtual superpage mapping; and
    accessing at least one of the virtual memory pages using the new virtual superpage mapping while the memory controller is copying old physical memory pages to new physical memory pages.

2. The method of claim 1 wherein said allocating step allocates a contiguous set of physical memory pages.

3. The method of claim 1 wherein said accessing step includes the step of directing a read operation for an address of the new page mapping which is currently being copied to a corresponding address of an old page mapping.

4. The method of claim 1 wherein said accessing step includes the step of directing a write operation for an address of the new page mapping which is currently being copied to both the address of the new page mapping and a corresponding address of an old page mapping.

5. The method of claim 1 wherein said accessing step includes the step of directing a write operation for an address of the new page mapping which has not yet been copied to a corresponding address of an old page mapping.

6. The method of claim 1, further comprising the step of updating an entry in a cache memory of the data processing system which corresponds to a memory location in the virtual memory page, by modifying an address tag of the cache entry according to the new page mapping.

7. A memory controller comprising:
an input for receiving remapping instructions for a virtual superpage;
a mapping table which temporarily stores entries of old page addresses and corresponding new page addresses associated with the page remapping instructions; and
a memory access device which directs the copying of memory pages from the old page addresses to the new page addresses while handling access operations which use the new page addresses, and releases the entries in said mapping table as copying for each entry is completed.

8. The memory controller of claim 7 wherein said mapping table has 32 slots for receiving corresponding pairs of the old page addresses and new page addresses.

9. The memory controller of claim 7 wherein said memory access device directs a read operation for a new page address which is currently being copied to a corresponding old page address.

10. The memory controller of claim 7 wherein said memory access device directs a write operation for a new page address which is currently being copied to both the new page address and a corresponding old page address.

11. The memory controller of claim 7 wherein said memory access device directs a write operation for a new page address which has not yet been copied to a corresponding old page address.

12. The memory controller of claim 7 wherein said memory access device includes a state engine which sequentially reads the paired old and new pages addresses in said mapping table.

13. The memory controller of claim 12 wherein said memory access device further includes a direct memory access (DMA) engine controlled by said state engine which carries out actual copying of the memory pages.

14. A computer system comprising:
a processing unit;
an interconnect bus connected to said processing unit;
a memory array; and
a memory controller connected to said interconnect bus and said memory array, wherein said memory controller copies memory pages from old page addresses to new page addresses according to a new virtual superpage mapping while handling access operations which use the new page addresses and while said processing unit carries out program instructions using the new page addresses.

15. The computer system of claim 14 wherein:
said processing unit includes a processor core having a translation lookaside buffer (TLB) whose entries keep track of current virtual-to-physical memory address assignments; and
said TLB entries are updated for the new page addresses prior to completion of copying of the memory pages by the memory controller.

16. The computer system of claim 14 wherein:
said processing unit has a processor core and an associated cache; and
said cache modifies an address tag of a cache entry which corresponds to a memory location in the new page addresses.

17. The computer system of claim 16 wherein said cache modifies the address tag of the cache entry in response to a determination that the cache entry contains a valid value which is not present elsewhere in the system.

18. The computer system of claim 16 wherein said cache further relocates the cache entry based on a changed congruence class for the modified address tag.

19. The computer system of claim 14 wherein said memory controller includes:
a mapping table which temporarily stores entries of old page addresses and corresponding new page addresses; and
a memory access device which directs the copying of the memory pages from the old page addresses to the new page addresses and releases the entries in said mapping table as copying for each entry is completed.

20. The computer system of claim 14 wherein said processing unit, said interconnect bus, said memory array and said memory controller are all part of a first processing cluster, and further comprising a network interface which allows said first processing cluster to communicate with a second processing cluster, said memory controller having at least one pointer for a new page address which maps to a physical memory location in said second processing cluster.

* * * * *